United States Patent [19]

Bopp

[11] E Re. 29,928

[45] Reissued Mar. 13, 1979

[54] CONTROL FOR FLUID COUPLING

[75] Inventor: Warren G. Bopp, Farmington Hills, Mich.

[73] Assignee: Eaton Corporation, Cleveland, Ohio

[21] Appl. No.: 849,192

[22] Filed: Nov. 7, 1977

Related U.S. Patent Documents

Reissue of:

[64] Patent No.: 3,952,508
Issued: Apr. 27, 1976
Appl. No.: 563,551
Filed: Mar. 31, 1975

[51] Int. Cl.[2] ..... F16D 33/00

[52] U.S. Cl. ..... 60/330; 60/339; 60/347; 60/353; 60/359; 60/364; 188/296

[58] Field of Search ..... 60/330, 329, 339, 342, 60/347, 353, 355, 356, 357, 359, 360, 364; 188/275, 276, 277, 296

[56] References Cited

U.S. PATENT DOCUMENTS

| | | | |
|---|---|---|---|
| 2,837,285 | 6/1958 | Urban | 60/329 X |
| 3,053,051 | 9/1962 | Kelley | 60/329 |
| 3,257,808 | 6/1966 | Kuiper | 60/352 |
| 3,537,264 | 11/1970 | Nagel | 60/357 |
| 3,572,480 | 3/1971 | Nagel | 60/353 X |
| 3,690,428 | 9/1972 | Laflame | 192/52 B |
| 3,756,028 | 9/1973 | Bopp et al. | 60/353 |

*Primary Examiner*—Edgar W. Geoghegan
*Attorney, Agent, or Firm*—Paul S. Rulon

[57] ABSTRACT

A temperature and speed responsive control for a fluid coupling adapted to drive a cooling fan for an internal combustion engine. The coupling is of the hydrokinetic type and includes an input or drive member adapted to be driven by the engine, an output or driven member defining a housing adapted to carry the fan, a fluid working chamber defined by the drive and driven member, a cylindrical sleeve controlled by a fluid pressure and operative to vary the output speed by controlling fluid circulation in the working chamber, means in the working chamber for producing the fluid pressure, and temperature and speed responsive means for controlling the fluid pressure to the sleeve in response to temperature and speed changes.

46 Claims, 4 Drawing Figures

10
12
16
18
30
34
128
132
128c
130a
128b
130
134
136
120
116a
118
32
118c
100
116b
116
122
92
90b
90
90a
94
74a
74c
74b
74
88
86
80
84
82
124
46a
46
48
50
54
56
58
60
62
64
66
68
70
72
40
42
44
52
76
78
102
106
108
110
112
114
104
98
98a
98b
98c
126
118a
118b
130b
130c
52a
52b
52c
96
96a
96b
96c
96d
96e
97

CONTROL FOR FLUID COUPLING

Matter enclosed in heavy brackets [ ] appears in the original patent but forms no part of this reissue specification; matter printed in italics indicates the additions made by reissue.

BACKGROUND OF THE INVENTION

1. Cross-references

This application contains subject matter generic to the temperature responsive control disclosed in copending application Ser. No. [428,187] *528,187* filed Nov. 29, 1974.

2. Field of the Invention

This invention relates generally to speed control of fluid couplings and specifically to speed control in response to temperature and speed.

3. Description of the Prior Art

It is well known to regulate the speed of an engine driven cooling fan in accordance with cooling demand, rather than in accordance with engine speed. The cooling demand is low during engine warm up, cold weather operation, and high vehicle speed. By contrast, demand is high during hot weather, particularly when the vehicle is not moving and the engine is idling.

The use of fluid couplings of the viscous shear type and of the hydrokinetic type to drive engine cooling fans for vehicles is well known. The output speed of such couplings may be controlled in accordance with cooling requirements, thereby allowing lower fan speeds when cooling requirements are low; this has the advantage of reducing engine fuel consumption and fan noise.

Controls to vary the output speed of such couplings in response to temperature and/or speed are well known in the prior art. Temperature control has been provided by a bimetallic spring in many of the viscous coupling controls. In such controls the spring rotates with the coupling and applies a force to move a valving member by bending or straightening in response to temperature changes. However, such springs generate a relatively small force per degree temperature change. Therefore, the controls are susceptible to erratic operation due to rotational forces acting on the spring and/or moveable parts of the control. Further, foreign matter in the control or corrosion of the moveable parts can easily render the control totally inoperative.

If a viscous coupling is to be controlled in response to ambient temperature exterior of the coupling, the spring (by necessity) is positioned on the coupling exterior. When exteriorly positioned, the spring must also move an intermediate mechanism which passes through a wall of the coupling. The force needed to reliably move the intermediate mechanism and the valving member is close to the maximum practical force which can be generated by the spring; therefore, the spring must be located on the coupling in a position least influenced by rotational forces. Exteriorly positioned springs are traditionally positioned coincident the rotational axis of the coupling to avoid rotational forces. However, this is a poor position for a temperature sensing element, since better temperature responses can be obtained at a radial extremity of the coupling where air flow is greater.

Erratic operation of the control due to sticking may be further compounded when a bimetallic spring is used in combination with a centrifugal weight for limiting maximum speed of the coupling, since the forces produced by the weight may be low so that they are in proportion to the low force produced by the spring.

SUMMARY OF THE INVENTION

An object of this invention is to provide an improved fluid regulating control for a fluid coupling.

A more specific object of the invention is to provide such a control which is insensitive to centrifugal forces generated by rotation of the coupling.

Another object is to provide such a control which provides improved temperature response.

Another object is to provide a temperature and speed responsive control wherein the temperature and speed signals are generated and combined in a manner to provide accurate and reliable operation of the coupling[; and].

Another object is to provide a control for a hydrokinetic coupling which is simpler and more compact than the prior art couplings and which yet provides improved control.

The fluid coupling controlled by the invention includes a rotatable housing member and another member disposed in the housing and mounted for rotation relative to the housing member. The members define a working chamber containing an inventory of fluid for transmitting torque from the one member to the other; and the control varies the torque transmitted by the fluid.

According to a feature of the invention, a temperature responsive device is carried on the exterior of the housing member at a position radially disposed from the rotational axis of the member and the torque transmitted by the fluid is varied in response to sensed changes in temperature ambient to the exterior of the housing member.

According to another feature of the invention, the torque transmitted by the fluid is controlled by a valving member, which is responsive to centrifugal force generated by rotation of the coupling, and a temperature sensing mechanism which varies the force required to move the valving member in response to changes in the temperature ambient to the exterior of the coupling.

The coupling controlled by the invention is more specifically a hydrokinetic coupling including input and output members defining a toroidal working chamber containing an inventory of fluid for transmitting torque from the input member to the output member in response to a toroidal flow of the fluid in the chamber.

According to a further feature of the invention, a temperature sensing device, carried by one of the members of the hydrokinetic coupling, is operative to vary the torque transmitted by the fluid in the working chamber in response to sensed temperature changes.

According to a further feature of the invention, sensing means, responsive to an operating condition of the coupling, controls the torque transmitted by the fluid in the working chamber by controlling the flow of a fluid pressure generated in the working chamber of the hydrokinetic coupling.

BRIEF DESCRIPTION OF THE DRAWINGS

A preferred embodiment of the invention is shown in the accompanying [drawing] *drawings* in which.

DESCRIPTION OF THE PREFERRED EMBODIMENT

The present invention includes a novel control for a fluid coupling. The control is shown embodied in a hydrokinetic coupling 10 of FIG. 1. However, a portion of the control is adaptable to other devices and is particularly adaptable to viscous fluid couplings. The disclosed coupling is adapted to be driven by a liquid cooled engine and in turn drive a cooling fan 12 for removing heat from the engine coolant. Fan 12 is partially shown in phantom lines in FIG. 2.

Figure 1:
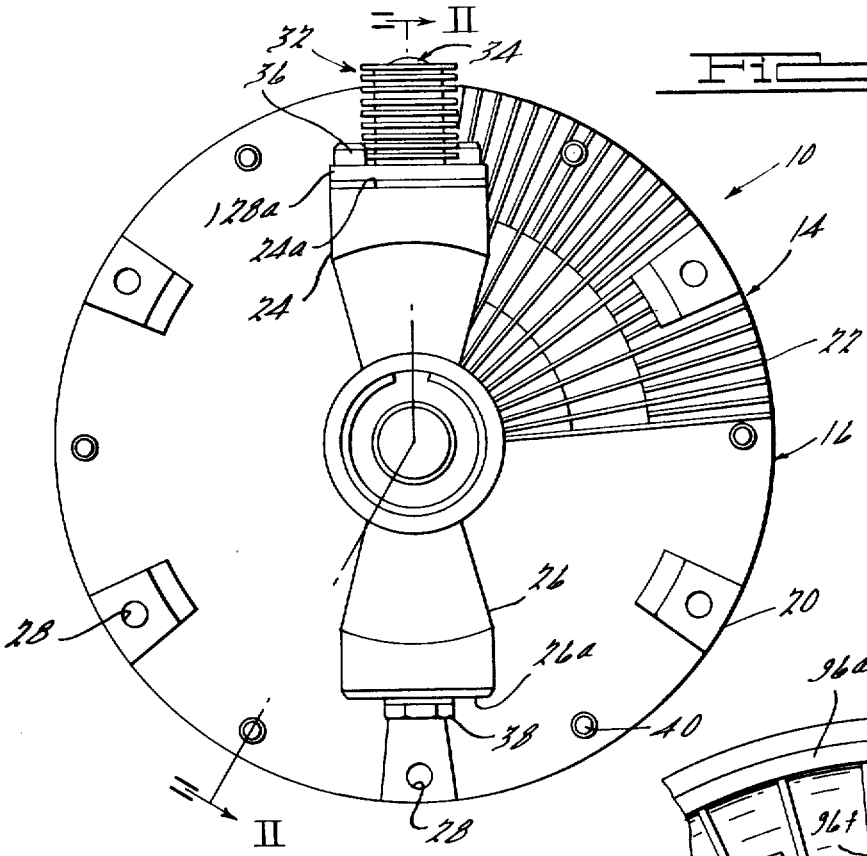
FIG. 1 is a front elevational view of the coupling.
Figure 2:
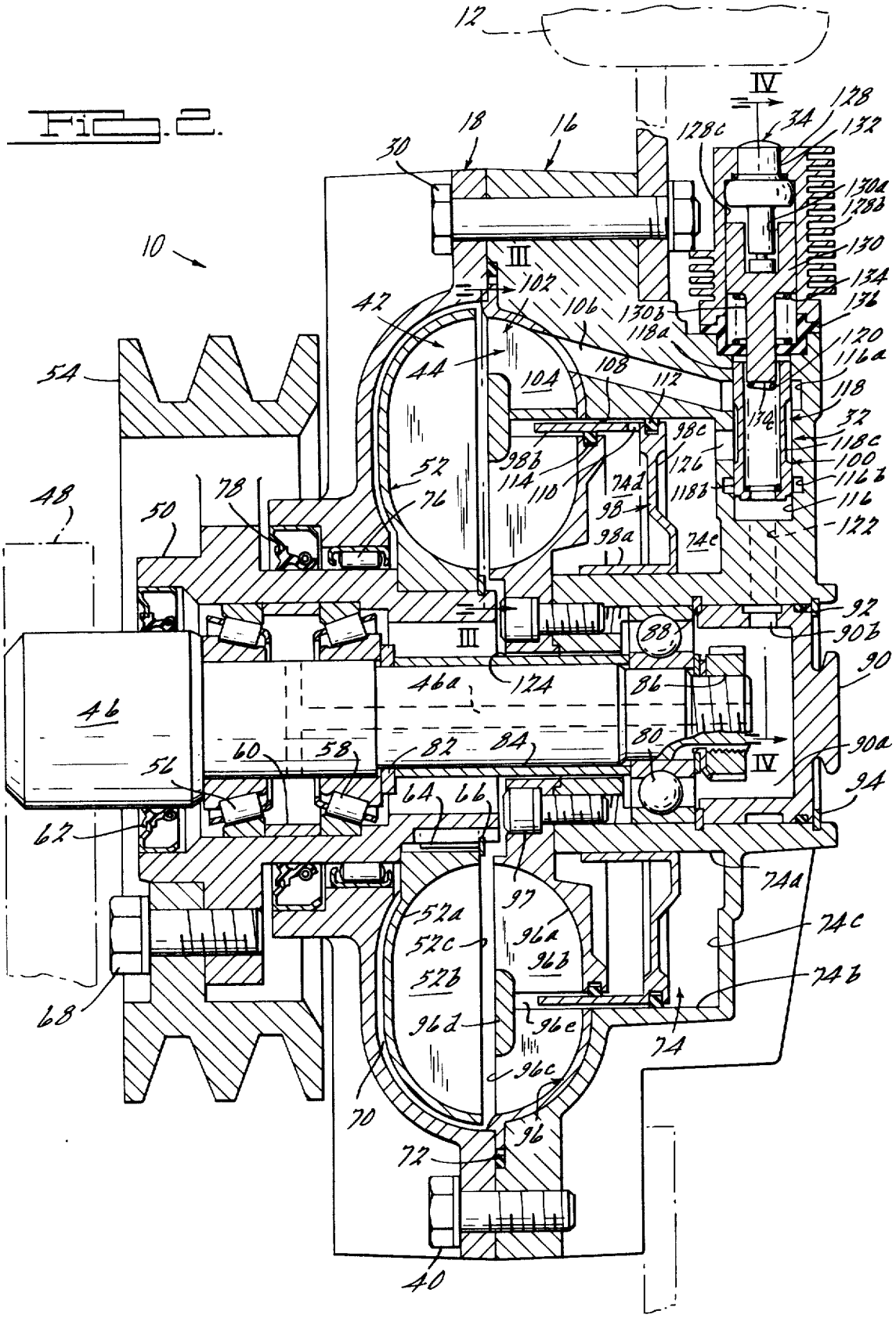
FIG. 2 is an enlarged sectional view of the coupling of FIG. 1, looking in the direction of arrows II—II.

Referring now to FIG. 1, coupling 10 includes a cast metal housing 14 consisting of a front housing member 16 and a rear housing member 18. Housing member 18 is shown only in FIG. 2. Front housing member 16 is integrally formed with six radially disposed bosses 20, a plurality of cooling fins 22, and a pair of raised portions 24 and 26. Bosses 20 are machined and drilled with through holes 28 for mounting and securing the fan to the housing by nut and bolt sets 30, as shown in FIG. 2. Raised portion 24 provides housing and support structure for a portion of a control assembly 32. Control assembly 32 regulates the output speed of the coupling in response to speed and temperature. A temperature sensing mechanism 34 of the control assembly is secured to an end wall portion 24a of raised portion 24 by screws 36. Raised portions 24 and 26 are symmetrical about the rotational axis of the coupling for balance purposes. An end wall 26a of raised portion 26 is provided with a threaded service plug 38 for checking and filling the fluid level in the coupling.

The front and rear housing members are secured together, independent of the fan mounting bolts, by six screws 40 which are circumferentially spaced between the fan mounting bolts. The ends of screws 40 are visable in FIG. 1. One of the screws is shown in FIG. 2.

Referring now to FIG. 2, coupling 10 includes a driving or impeller assembly 42, a driven or turbine assembly 44, a non-rotating shaft 46 which rotatively supports the impeller and turbine assemblies, and control assembly 32 which regulates relative rotation between the driving and driven assemblies by controlling torque transmission from the impeller to the turbine.

Shaft 46 is adapted to be supported at its left end by a hanger bracket 48 which is in turn adapted to be fixed to an engine, not shown.

Driving assembly, 42 includes a sleeve 50, an impeller 52 and a V-belt pulley 54. Sleeve 50 is rotationally supported on shaft 46 by a pair of tapered roller bearings 56 and 58 which are spaced apart by a sleeve 60. The cavity surrounding bearings 56 and 58 is sealed at its left end by a seal 62. Impeller 52 is secured to the [left] *right* end of sleeve 50 by a key 64 and a snap ring 66. V-belt pulley 54 is bolted to the left end of sleeve 50 by a plurality of bolts 68.

Driven assembly 44 includes housing members 16 and 18. Housing members 16 and 18 define a toroidal chamber 70 which is sealed at its radially outward extent by a seal 72. Housing member 16 also defines an annular chamber 74 having concentric wall portions 74a and 74b respectively, and a radially extending end wall portion 74c. Rear housing member 18 is rotationally supported on sleeve 50 by a roller bearing 76. A seal 78 prevents oil leakage through bearing 76. Front housing member 16 is rotationally supported on shaft 46 by a ball bearing 80. A washer 82 and a sleeve 84 provide proper spacing between bearings 80 and 58. The inner race of bearing 80 is secured to shaft 46 by nut 86. Nut 86 also provides a preload for bearings 56 and 58. The outer race of bearing 80 is secured to housing 16 by a snap ring 88. Fluid leakage from the cavity surrounding shaft 46 is prevented by a cap 90 and seal 92. Cap 90 is retained by a snap ring 94.

Impeller 52 is disposed in one half of toroidal chamber 70 and rotates relative to the chamber. A turbine 96 is disposed in the other half of the chamber. Turbine 96 is secured to front housing member 16 by a plurality of screws 97 and rotates with the chamber.

Impeller 52 includes a wall portion 52a which defines an annular trough 52b concentric to the axis of shaft 46. Turbine 96 includes a wall portion 96a which defines an annular trough 96b concentric to the axis of shaft 46 and confronting trough 52b. A plurality of blade sets 52c and 96c are circumferentially disposed in troughs 52b and 96b, respectively. Both blade sets may be cast integrally with the walls or fabricated separately and then screwed to the walls. Turbine 96 further includes a core guide ring 96d formed with [blade sets 96b] *blade sets 96c* and an annular slot 96c. Slot 96c extends through wall portion 96a and blade sets [96b] *96c* and terminates at the core guide ring. The portion of wall 96a extending radially inward of slot 96e defines an end wall of the annular chamber 74.

Troughs 52b and 96b define a toroidal working chamber which is filled with a fluid, such as transmission fluid. When impeller 52 is rotated, blades 52c accelerate the fluid radially outward with respect to the rotational axis of trough 52b. The curvature of trough 52b directs the fluid into trough 96b. The fluid impacts blade sets 96c and imparts a torque to the turbine. The curvature of trough 96b directs the fluid radially inward and back into trough 52b. Continued rotation of the impeller reaccelerates the fluid, thereby establishing a toroidal fluid flow in the working chamber.

In general, torque transmission through a hydrokinetic coupling increases with increasing fluid circulation in the working chamber. Fluid circulation and torque transmission are a maximum for a given size coupling and impeller speed when the turbine is stalled. Fluid circulation and torque transmission through the coupling may be regulated by controlling the impeller speed relative to turbine speed [of] *or* the amount of fluid circulation in the working chamber independent of the impeller speed. The amount of fluid circulation may be controlled by removing fluid from the working chamber or by restricting circulation. Herein, restriction is disclosed; however, control assembly 32 may be adapted to control fluid circulation via fluid removal.

Control assembly 32 includes a reciprocatable sleeve assembly 98 disposed in the annular chamber 74, the temperature sensing mechanism 34 and a spool valve assembly 100, and a source of pressurized fluid 102 for controlling the position of the sleeve assembly in chamber 74.

Figure 3:
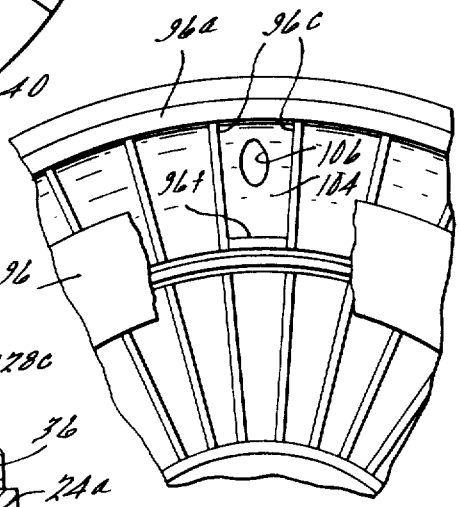
FIG. 3 is a fragmentary view of the turbine of FIG. 2, looking in the direction of arrows III—III.

Referring now to FIGS. 2 and 3, the source of pressurized fluid includes a cavity 104 and a passage 106. The cavity is best seen in FIG. 3 and is defined by a portion of turbine wall 96a, two adjacent blades of blade sets 96c, and a divider plate 96f. Divider plate 96f blocks the flow of fluid between the adjacent blades, thereby raising the static pressure of the fluid in the cavity above the static pressure of the circulating fluid by converting the velocity component of the fluid to pressure.

Sleeve assembly 98 includes cylindrical sleeve portions 98a and 98b and a radially extending flange portion 98c which rigidly joins the sleeve portions together and divides annular chamber 74 into two variable volume chambers 74d and 74e. Cylindrical sleeve portion 98a is in sliding sealing contact with wall 74a and also provides support to prevent cocking of the sleeve assembly in chamber 74. Cylindrical sleeve portion 98b and wall 74b are spaced apart to define an annular passage 108 for communicating fluid between trough 96b and chamber 74d via a passage 110 in sleeve portion 98b. Passage 110 may be singular or plural in number. A seal 112 prevents fluid communication between annular passage 108 and chamber 74e. A seal 114 prevents direct fluid communication between trough 96b and chamber 74d.

Cylindrical sleeve portion 98b is disposed for movement into and out of annular slot 96e to control fluid circulation in the working chamber defined by troughs 52b and 96b. When sleeve portion 98b is fully inserted into slot 96e the left end of the sleeve abuts core guide ring 96d and blocks substantially all fluid circulation in the working chamber, thereby reducing torque transmission from the impeller to the turbine to a low amount. This low amount of transmitted torque is attributed to fluid shear stresses due to relative rotation between members and eddy fluid circulation which occurs between the troughs at positions radially outward from and radially inward from the core guide ring. When sleeve portion 98b is fully withdrawn from slot 96e, maximum fluid circulation in the working chamber is possible, thereby allowing maximum torque transmission from the impeller to the turbine.

Sleeve assembly 98 is shown in an intermediate position in FIG. 2, i.e., chambers 74d and 74e are about the same in volume and the right end of sleeve portion 98b extends about half way into slot 96e, thereby blocking about half of the fluid circulation in the working chamber and reducing torque transmission from the impeller to the turbine to about one half. The positioning of sleeve portion 98b into and out of the slot 96e is controlled by varying the differential fluid pressure acting on radially extending wall 98c; this is accomplished by controlling the fluid pressure in chamber 74e with temperature sensing mechanism 34 and spool valve assembly 100.

Figure 4:
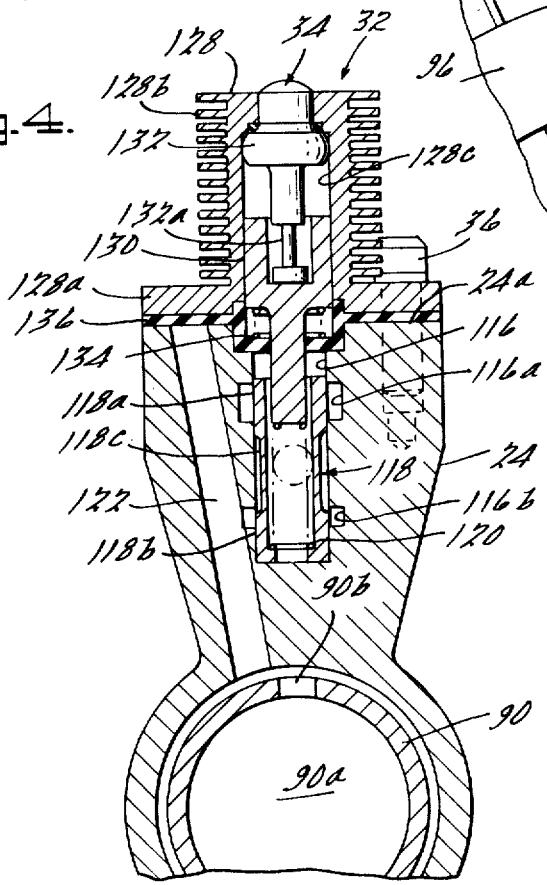
FIG. 4 is a sectional view of a central assembly in FIG. 2, looking in the direction of arrows IV—IV.

Referring now to FIGS. 2 and 4, the temperature sensing mechanism and the spool valve assembly cooperate to provide a control responsive to the rotational speed of the driven part of the coupling (i.e., housing 14) and the ambient temperature exterior of the housing. Spool valve assembly 100 is contained in raised portion 24 and includes a stepped bore 116 extending radially outward with respect to the rotational axis of the coupling, a cylindrical valving member 118, and a helical compression spring 120 for biasing the valving member radially inward and counter to centrifugal forces which act on valving member 118. Bore 116 includes an annular inlet groove 116a which communicates with passage 106 and an annular return groove 116b which communicates with a return passage 122 shown in phantom lines in FIG. 2 and in detail in FIG. 4. Passage 122 communicates return fluid to a cavity 90a defined by cap 90 via a passage 90b in the cap. Fluid in cavity 90a is used to lubricate bearings 80, 58, and 56. A portion of the fluid in cavity 90a returns to the working chamber via bearing 80 and a restricted annular passage 124; the remainder of the fluid returns to the working chamber via a T-shaped passage 46a in shaft 46. A passage 126 communicates bore 116 with chamber 74e. Valving member 118 includes two annular lands 118a and 118b which are spaced apart by an annular groove 118c. The position of valving member 118 in bore 116 is determined by the biasing force of spring 120 and the centrifugal force acting on the valving member. For intermediate positions of the valving member these forces balance out. FIG. 2 shows the valving member in an intermediate position. In this position return groove 116b is blocked and inlet groove 116a is partially uncovered thereby allowing the flow of pressurized fluid from passage 106 to chamber 74e and causing sleeve portion 98b to move further into slot 96e to further restrict fluid circulation in the working chamber. FIG. 4 shows valving member 118 bottomed in bore 116. In this position inlet groove 116a is blocked and return groove 116b is uncovered, thereby porting the fluid in chamber 74e to return and allowing the pressure in chamber 74d to rise above the pressure in chamber 74e via annular passage 108 and passage 110. Hence, sleeve portion 98b moves out of slot 96e and fluid circulation in the working chamber increases.

The temperature sensing mechanism includes a housing member 128, a thermal insulating piston 130, a temperature responsive wax filled power element 132, and a helical compression spring 134. Housing member 128 includes a flange portion 128a (best seen in FIG. 1), heat transfer fins 128b, and a stepped bore 128c which is axially aligned with bore 116. Flange portion 128a is secured to end face 24a of raised portion 24 via screws 36 (see FIG. 1). A seal 136 thermally insulates housing 128 from raised portion 24, prevents fluid leakage, and provides a reaction seat for spring 134. Piston 130 includes a cup-shaped portion 130a which embraces one end of element 132 and a shaft portion 130b having an end 130c which extends into valving member 118 to provide a moveable reaction seat for spring 120. Spring 134 is seated against the bottom of cup portion 130a and biases piston 130 toward element 132.

Housing 128 and element 132 are thermally insulated from metal contact with the coupling housing so that element 98 may respond to ambient temperature exterior of the coupling. The thermal insulating provided by piston 130 and seal 136 is not defeated by oil that may come into contact with housing 128 and element 132, since this oil is relatively stagnant and has a low conductive heat transfer. The ability of the element to respond to ambient temperature exterior of the coupling is further enhanced by placing the temperature control radially outward of the rotational axis of the coupling and into a position allowing greater ambient air flow over the element.

Temperature responsive wax filled power elements are well known in the art of thermostatic valves for engine cooling systems. Element 132 is pressed into housing 128 to enhance heat transfer from the housing to the wax in the element. Element 132 includes a push rod 132a which extends from the element and into contact with piston 130 (see FIG. 4). The wax in the element is selected to have a high coefficient of expansion at its liquid solid phase change temperature. The wax volume increases when it liquifies and moves the push rod outward from the element, thereby moving piston 130 radially inward to increase the biasing force exerted on valving member 118 and establishing a higher speed limit for the coupling. The wax volume decreases when it solidifies and spring 134 moves the piston and push rod toward the element, thereby decreasing the biasing force exerted on the valving member and establishing a lower speed limit for the coupling.

A preferred embodiment of the invention has been disclosed wherein the output speed of a hydrokinetic coupling is controlled by temperature and speed responsive means which vary the torque transmitted by the fluid in the coupling. In the disclosed embodiment a cylindrical sleeve is moved into or out of the coupling to vary fluid circulation in the working chamber in response to ambient temperature exterior of the coupling and output speed of the coupling. The preferred embodiment was disclosed for illustrative purposes. Several variations and modifications of the preferred embodiment are within the spirit of the invention. For example, movement of the sleeve can be controlled solely by the temperature responsive means or solely by the speed responsive means; or the sleeve can be dispensed with and the temperature and/or speed responsive means can be used to control the amount of fluid in the working chamber of the disclosed hydrokinetic coupling or a viscous shear coupling. Further, sleeve 98 can be controlled mechanically by the temperature and/or speed responsive means; or fluid pressure can be used to move the sleeve in one direction and a spring means can be used for movement in the other direction.

The following claims are intended to cover the invention portions of the preferred embodiment and variations and modifications within the spirit of the invention.

What is claimed is:

1. A fluid coupling comprising:

a first rotatable member defining a housing rotatable about an axis;

a second member disposed in the interior of said housing and rotatable about said axis;

a working chamber defined by said members and containing an inventory of fluid for transmitting torque from one of said members to the other of said members via said fluid in response to relative rotation between said members;

*a second chamber separate and distinct from said working chamber;*

*first and second passage means for communicating said working chamber with said second chamber;* control means including means moveable between *a* first *position unblocking one of said passages* and *a* second [positions] *position blocking said one passage* for varying the torque transmitted by said fluid; and temperature sensing means radially disposed with respect to said axis and mounted on the exterior of said housing and including means operative to urge said moveable means between said first and second positions in response to changes in the temperature ambient to the exterior of said housing.

2. The coupling of claim 1 wherein movement of said moveable means from said second position toward said first position increases the torque transmitted by said fluid and said temperature sensing means moves said control means toward said first position in response to increasing temperatures.

3. The coupling of claim 1, further including: speed sensing means responsive to the speed of said housing and operative to urge said moveable means toward said second position in response to increasing rotational speed of said housing.

4. The coupling of claim 1 wherein said temperature sensing means includes:

means containing a liquid-solid phase change substance having a high coefficient of expansion during phase change and operative to move said control means between said first and second positions in response to a phase change of said substance occurring over a predetermined temperature range of said ambient temperature.

5. The coupling of claim 1, [further including] *wherein:*

[a second chamber defined by said housing member;

first passage means for communicating fluid flow from said working chamber to said second chamber; and second passage means for communicating fluid flow from said second chamber to said working chamber,] said moveable means is operative when in said first position to block fluid flow in said first passage and is operative when in said second position to block said second passage.

6. The coupling of claim 1, wherein [said control includes]:

[passage means for removing fluid flow from said working chamber; and]

said moveable means is operative to block said *first* passage when in said first position and allow flow from said working chamber *via said first passage* when in said second position.

7. The coupling of claim 6, further including:

resilient means operatively interposed between said temperature sensing means, and said temperature sensing means increasingly urges said moveable means toward said first position in response to increases in the sensed temperature by increasing the bias force of said resilient means.

8. The [control] *coupling* of claim 7 wherein said moveable means is responsive to the rotational speed of said housing member and said moveable means moves toward said second position in increasing opposition to said bias force in response to increasing rotational speed of said housing member.

9. The coupling of claim 8 wherein said temperature sensing means includes:

means containing a liquid-solid phase change substance having a high coefficient of expansion during phase change and operative to move said control means between said first and second positions in response to a phase change of said substance occurring over a predetermined temperature range of said ambient temperature.

10. The coupling of claim 1 wherein said control means further includes:

a bore formed in said housing and disposed substantially parallel to a radius extending from said rotational axis;

a passage communicating said working chamber with said bore for removing fluid from said chamber, and said moveable means is a spool valve slideably disposed in said bore and operative to block said passage when in said first position and allow fluid flow from said passage when in said second position, and resilient means disposed radially outward from said spool valve and operative to apply a force for biasing said spool valve radially inward toward said first position; and said temperature sensing means is operative to increase said bias force in response to sensed increases in said ambient temperature.

11. A fluid coupling comprising:

a first rotatable member defining a housing rotatable about an axis;

a second member disposed in the interior of said housing and rotatable about said axis;

a working chamber defined by said members and containing an inventory of fluid for transmitting torque from one of said members to the other of said members via said fluid in response to relative rotation between said members;

control means including moveable means biased toward a first position and moveable toward a second position in opposition to said biasing force in response to the rotational speed of said housing and operative to vary the torque transmitted by said fluid in proportion to the position of said moveable means between said first and second positions; and temperature sensing means for varying said biasing force in response to sensed temperature changes.

12. The coupling of claim 11 wherein:

the torque transmitted by said fluid is increased when said control means is moved toward said first position and decreased when moved toward said second position; and said temperature sensing means increases said biasing force in response to increases in the sensed temperature, thereby increasing the rotational speed required to decrease the torque transmitted by said fluid.

13. The coupling of claim 11 wherein said control means further includes:

a bore formed in said housing and disposed substantially parallel to a radius extending from said rotational axis; and a passage communicating said working chamber with said bore for removing fluid from said chamber, and said moveable means is a spool valve slideably disposed in said bore and operative to block said passage when biased to said first position and allow fluid flow from said passage when moved to said second position when the rotational force on said spool exceeds the bias force of said spring.

14. The coupling of claim 13 wherein said temperature sensing means includes:

means containing a liquid-solid phase change substance having a high coefficient of expansion during phase change and operative to increase said bias force in response to a phase change occurring from a sensed temperature increase and operative to decrease said bias force in response to a phase change occurring from a sensed temperature decrease.

15. An improved control for varying the output speed of a fluid coupling of the type wherein a rotatable impeller member and turbine member define a toroidal working chamber containing an inventory of fluid for transmitting torque from the impeller to the turbine by toroidally circulating the fluid in the chamber in response to rotation of the impeller, and whereby an increase in the rotational speed of the impeller relative to the turbine increases the fluid circulation and torque transmitted by the fluid, said improvement comprising:

means moveable between first and second positions for varying the toroidal circulation of said fluid independent of the relative speed of said impeller and turbine; and temperature sensing means carried by one of said members and operative to vary the position of said moveable means between said first and second positions in response to sensed temperature changes.

16. The control of claim 15, further including:

blocking means moveable into said working chamber for restricting fluid circulation in said working chamber in response to said temperature sensing means moving said moveable means to said second position.

17. The control of claim 16 wherein said blocking means is a cylindrical sleeve.

18. The control of claim 15 wherein:

said moveable means is a speed sensing means responsive to the rotational speed of one of said members and operative in combination with said temperature sensing means to vary the torque transmitted by the fluid in said working chamber in response to changes in rotational speed of said members.

19. The control of claim 18, further including:

resilient means for biasing said speed sensing means to said first position and said speed sensing means moves in increasing opposition to said bias in response to increasing rotational speed of said member; and said temperature sensing means increases said bias in response to increases in the sensed temperature.

20. The control of claim 19, further including:

blocking means moveable into and out of said working chamber for restricting fluid circulation when in said chamber and allowing unrestricted fluid circulation when moved out of said chamber.

21. The control of claim 20, further including a source of fluid pressure and wherein:

said blocking means moves in response to said fluid pressure; and said speed sensing means defines a valving member which prevents the flow of said fluid pressure to said blocking means when biased by said resilient means to said first position and operative to port said fluid pressure to said blocking means when in said second position.

22. The control of claim 15, further including:

a cylindrical sleeve moveable into said chamber for restricting circulation of the fluid in said chamber in response to said moveable means being moved to said second position by said temperature sensing means.

23. The control of claim 22 wherein said sleeve includes means responsive to a fluid pressure for moving said sleeve, and said control further includes:

a source of fluid pressure;

first passage means for communicating said fluid pressure responsive means with source; and said moveable means defines a valving member operative to block said passage when in said first position and unblock said passage when in said second position, and whereby said fluid pressure moves said sleeve into said working chamber when said valving member is in said second position.

24. The control of claim 23, further including:

means for urging said sleeve out of said working chamber and operative to move said sleeve out of said chamber only when said valving member is in said first position.

25. The control of claim 23 wherein said sleeve and said fluid pressure responsive means are reciprocatingly disposed in an annular chamber having concentric walls defined by said turbine member and said fluid pressure responsive means includes:

means in sliding-sealing contact with said concentric walls and dividing said annular chamber into two variable volume chambers and one of said variable volume chambers is fluidly connected to said source of fluid pressure via said first passage means when said valving member is in said second position, whereby said sleeve is moved into said working chamber in response to said valving member being moved to said second position.

26. The control of claim 25, further including:

a second passage means for communicating fluid from said one variable volume chamber; and said valving member includes means for blocking said second passage when said valving member is in said second position and unblocking said second passage when said valving member is in said first position.

27. The control of claim 26, further including:

means associated with the other variable volume chamber for urging said sleeve out of said working chamber and operative to move said sleeve out of said chamber only when said valving member is in said first position.

28. The control of claim 26 wherein said urging means includes:

third passage means for continuously fluidly communicating said other variable volume chamber with said working chamber and the fluid pressure communicated to said other variable volume chamber is less than the fluid pressure communicated to said one variable volume chamber, whereby fluid flows from said other variable volume chamber to said working chamber when said one variable volume chamber is in communication with said source of fluid pressure and fluid flows into said other chamber when said one variable chamber is in communication with said second passage.

29. The control of claim 28 wherein said valving member is a spool valve disposed in a bore defined by said turbine member and substantially parallel with a radius extending from the rotational axis of said turbine member, and said control further includes:

resilient means for applying a force for biasing said spool valve radially inward to the position blocking said passage, and said temperature sensing means is operative to increase said bias force when the sensed temperature increases from a second predetermined temperature to a first predetermined temperature.

30. An improved control for varying the output speed of a fluid coupling of the type wherein an impeller member and a turbine member, which each include pockets formed by blade sets, define a toroidal chamber containing a fluid for transmitting torque from said impeller to said turbine in response to acceleration of the fluid in said impeller pockets and circulation to the turbine pockets, and whereby an increase in the rotational speed of the impeller relative to the turbine increases the fluid circulation and torque, said improvement comprising:

means for stagnating fluid circulating in one of said pockets, thereby raising the static pressure of the stagnated fluid relative to the static pressure of the circulating fluid; and control means for varying said torque and fluid circulation independent of the rotational speed between said impeller member and turbine member, said control including 1. sensing means responsive to an operating condition of said coupling, and
2. valving means including a valving member moveable between first and second positions in response to sensed changes in said operating condition for controlling flow of said stagnated fluid from said one pocket, whereby said torque and fluid circulation in said chamber is controlled independent of the relative rotational speed between said impeller and turbine members.

31. The control of claim 30 wherein said sensing means includes:

temperature sensing means for increasingly urging said valving member toward said first position in response to increases in the sensed temperature.

32. The control of claim 31 wherein said temperature sensing means is carried by one of said members.

33. The control of claim 32 wherein said temperature sensing means senses temperature ambient to the exterior of said coupling.

34. The control of claim 30 wherein said stagnating means and said control means are carried by said turbine member.

35. The control of claim 34 wherein said valving means includes a first port in fluid communication with said stagnated fluid and said valving member prevents fluid flow from said port when in said first position and allows fluid flow from said port when in said second position.

36. The control of claim 35 wherein said control further includes:

fluid pressure responsive blocking means moveable into said working chamber for restricting the fluid circulation in said working chamber, and thereby decreasing said torque;

said valving means includes a second port for communicating said first port with said blocking means when said valving member is in said second position; and said sensing means is a temperature sensing means for increasingly urging said valving member toward said first position in response to ambient temperature changes exterior of said coupling.

37. The control of claim 36 wherein:

said valving means includes resilient means operatively interposed between said temperature sensing means and said valving member and said temperature sensing means increasingly urges said valving member toward said first position in response to increases in the sensed temperature by increasing the bias force of said resilient means.

38. The control of claim 37 wherein said valving member is responsive to the rotational speed of said turbine member and moves toward said second position in increasing opposition to said bias force in response to increasing rotational speed of said turbine member.

39. The control of claim 35 wherein:

said control further includes fluid pressure responsive means including blocking means moveable into said chamber for restricting said fluid circulation, and thereby decreasing said torque;

said valving means further includes a second port for communicating said fluid pressure responsive means with said first port when said valving member is in said second position; and said sensing means includes resilient means for biasing said valving member toward said first position and said valving member moves toward said second position in increasing opposition to said biasing in response to increasing rotational speed of said turbine member.

40. An improved control for varying the output speed of a fluid coupling of the type wherein an impeller member and a turbine member, which each include pockets formed by blade sets, define a toroidal chamber containing a fluid for transmitting torque from said impeller to said turbine in response to acceleration of the fluid in said impeller pockets and circulation to the turbine pockets, and whereby an increase in the rotational speed of the impeller relative to the turbine increases the fluid circulation and torque, said improvement comprising:

means for stagnating fluid circulating in one of said pockets, thereby raising the static pressure of the stagnated fluid relative to the static pressure of the circulating fluid;

a second chamber defined by said turbine member;

first passage means for communicating fluid flow from said one pocket to said second chamber;

second passage means for communicating fluid flow from said second chamber to said toroidal chamber;

valving means moveable between first and second positions and operative when in said first position to block fluid flow in said first passage and and allow fluid flow in said second passage, and operative when in said second position to allow fluid flow in said first passage and block fluid flow in said second passage; and sensing means responsive to an operating condition of said coupling for moving said valving means between said first and second positions in response to sensed changes in said operating condition.

41. The control of claim 40 wherein said second chamber is an annular chamber having concentric walls, and said control further includes:

a cylindrical sleeve reciprocatably diposed in said annular chamber and selectively moveable into said toroidal chamber to restrict fluid circulation in said toroidal chamber; and said sleeve includes:

fluid pressure responsive means in sliding-sealing contact with said concentric walls and dividing said annular chamber into two variable volume chambers, and one of said variable volume chambers is fluidly connected to said second passage when said valving means is in said first position and is fluidly connected to said first passage when said valving means is in said second position, whereby said fluid pressure responsive means moves said sleeve into said toroidal chamber when said valving means is in said second position.

42. The control of claim 41, further including:

means associated with the other variable volume chamber for urging said sleeve out of said toroidal chamber and operative to move said sleeve out of said toroidal chamber only when said valving means is in said first position.

43. The control of claim 42 wherein said urging means includes:

third passage means for continuously fluidly communicating said other variable volume chamber with said toroidal chamber and the fluid pressure communicated to said other variable volume chamber is less than the fluid pressure communicated to said one variable volume chamber, whereby fluid flows from said other chamber to said toroidal chamber when said valving means is in said second position and fluid flows to said other chamber from said toroidal chamber when said valving means is in first position.

44. The control of claim 43 wherein said sensing means includes:

temperature sensing means responsive to temperature ambient to the exterior of said coupling and operative to increasingly urge said valving means toward said first position in response to sensed increases in the ambient temperature.

45. The control of claim 44 wherein said valving means defines a speed sensing means operative to move toward said second position in response to increasing rotational speed of said turbine member, and said control means further includes:

resilient means interposed between said valving means and said temperature sensing means for biasing said valving means toward said first position, and said temperature sensing means increases said bias in response to increases in said sensed temperature.

*46. The coupling of claim 1, wherein:*

*said moveable means is operative in said first position to unblock said second passage to allow the flow of fluid from said second chamber to said working chamber for increasing the torque transmitted by said fluid and is operative in said second position to block said second passage to prevent the flow of fluid from said second chamber to said working chamber for decreasing the torque transmitted by said fluid.*

* * * * *